United States Patent [19]

Yamashita

[11] Patent Number: 5,068,889
[45] Date of Patent: Nov. 26, 1991

[54] CORDLESS TELEPHONE CAPABLE OF PROGRAMMING AN ID CODE INTO BOTH A BASE AND CORDLESS REMOTE UNIT VIA THE CORDLESS REMOTE UNIT

[75] Inventor: Kouji Yamashita, Hiroshima, Japan

[73] Assignee: Sharp Kabushiki Kaisha, Osaka, Japan

[21] Appl. No.: 448,838

[22] Filed: Dec. 12, 1989

[30] Foreign Application Priority Data

Dec. 12, 1988 [JP] Japan .................. 63-314476

[51] Int. Cl.$^5$ ............ H04M 1/56; H04M 11/00
[52] U.S. Cl. .................... 379/62; 379/63; 379/355
[58] Field of Search ................ 379/61–62, 379/356, 63, 354–355

[56] References Cited

U.S. PATENT DOCUMENTS

| 4,535,200 | 8/1985 | Himmelbauer et al. ........ 379/62 |
| 4,677,656 | 6/1987 | Bueke et al. ................. 379/63 |
| 4,720,855 | 1/1988 | Ohnishi et al. ............... 379/354 |
| 4,864,599 | 10/1989 | Saegusa et al. ............... 379/61 |

Primary Examiner—James L. Dwyer
Assistant Examiner—Dwayne D. Bost

[57] ABSTRACT

According to the invention, an E$^2$P-ROM, which is a non-volatile memory element capable of electrically reading and writing data as a memory element to store ID codes, is used and the remaining memory area of the non-volatile memory element is used to store abbreviated dialing numbers. This arrangement makes it unnecessary to separately provide a memory element to store the abbreviated dialing numbers and dispenses with the backup batteries for the abbreviated dialing numbers memory. The number of component parts can also be reduced to allow the telephone set to be manufactured at a lower cost. Further, a cordless remote unit can be used to program itself, and a base unit, with identical ID codes to provide private access lines. Also, the base unit can either read or write the ID code from or to its memory, respectively, dependent upon the transmission sent from the remote unit.

7 Claims, 7 Drawing Sheets

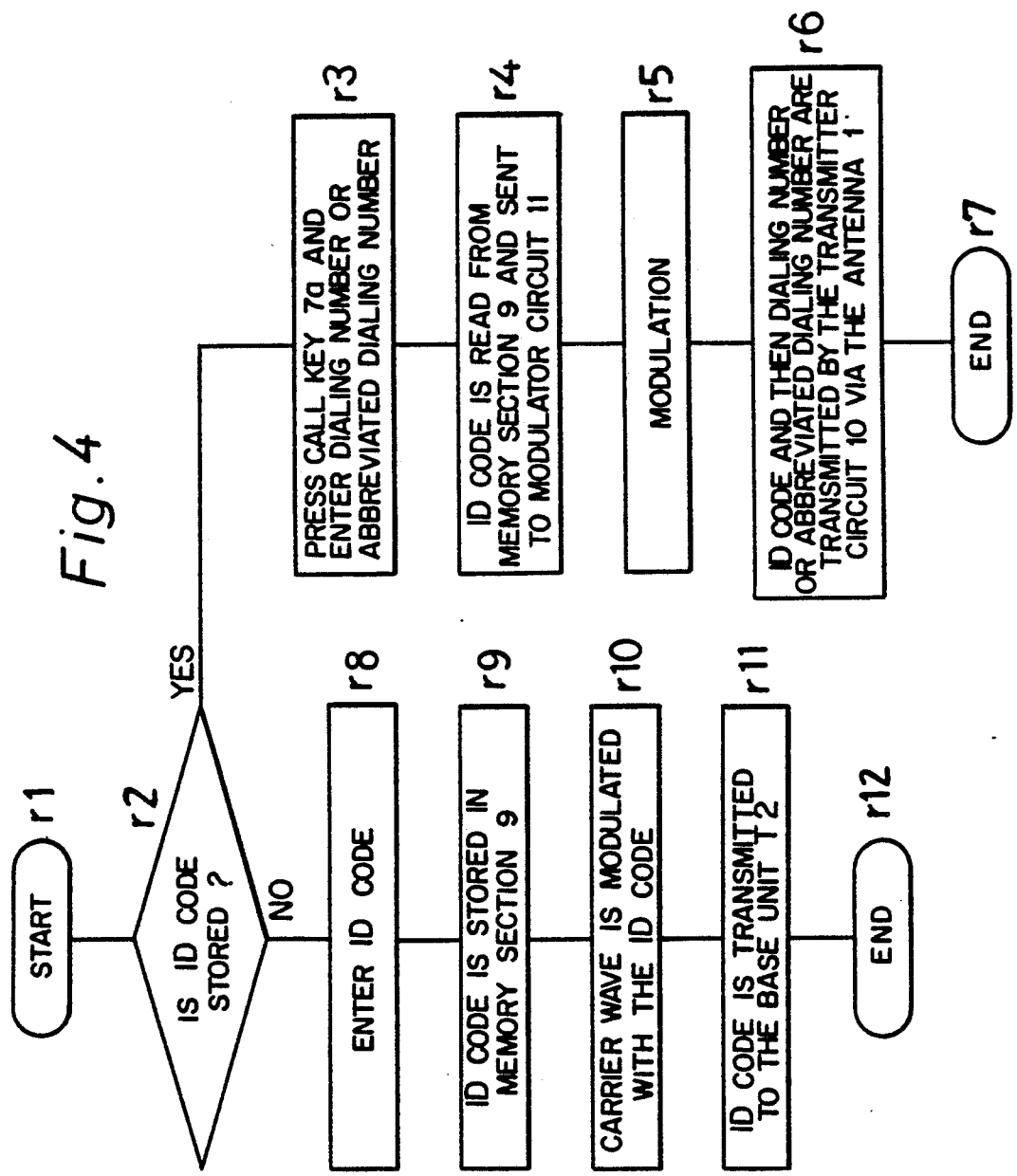

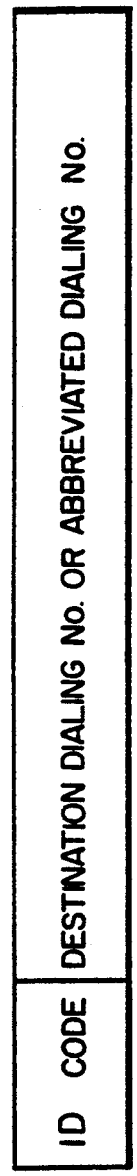
Fig. 5 (1)
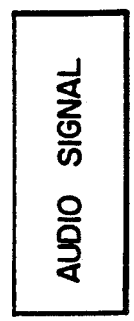
Fig. 5 (2)

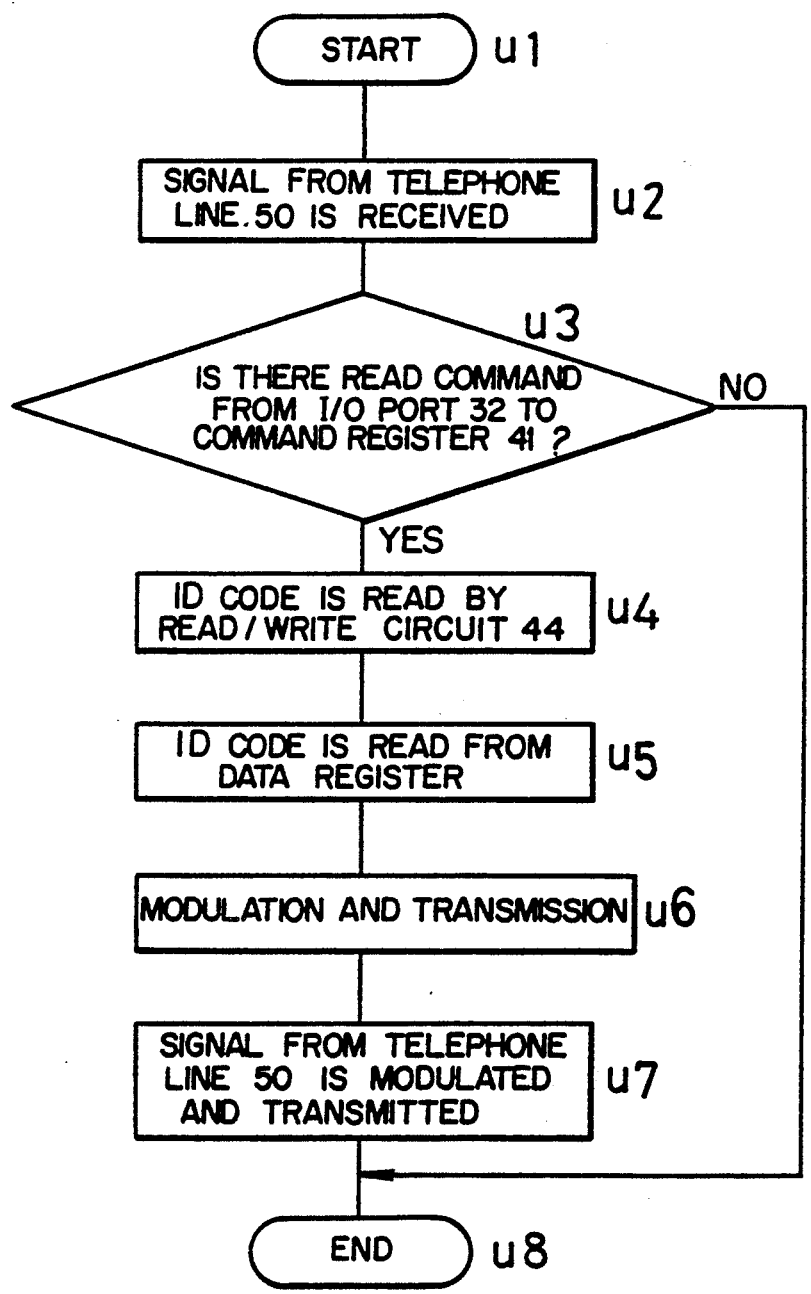

CORDLESS TELEPHONE CAPABLE OF PROGRAMMING AN ID CODE INTO BOTH A BASE AND CORDLESS REMOTE UNIT VIA THE CORDLESS REMOTE UNIT

BACKGROUND OF THE INVENTION

1. Field of the Invention

This invention relates to a cordless telephone which comprises a base unit and a remote unit which communicate with each other through radio transmission. Further, the base unit and the remote unit have the same identification code (abbreviated as ID code hereafter). The ID code is transmitted when trying to call the remote unit from the base unit or trying to call the base unit from the remote unit. Communication between both units is established only when the received ID code agrees with its ID code.

2. Prior Art

In a cordless telephone of the prior art, ID code is stored in an OTP-ROM (One Time programmable ROM), a fuse P-ROM or the like. Abbreviated dialing numbers to call a destination telephone by identifying it with a number of digits less than the digits of the dialing number of the destination telephone are stored in a RAM installed in a processor circuit, which is realized by a microcomputer, or a RAM provided near the processor circuit. Consequently primary batteries or secondary batteries for the backup of the, RAM which stores the abbreviated dialing numbers, have usually been used in preparation for power outage.

As explained, the prior art system requires the RAM to store ID codes and the RAM to store abbreviated dialing numbers to be separately provided, as well as batteries to backup the RAM memory element, storing the abbreviated dialing numbers to be provided. Thus the telephone set has thus been complex in construction and high in production cost

SUMMARY OF THE INVENTION

The present invention has been made in view of the current situation as described above, for the purpose of providing a cordless telephone of lower cost and improved service capability for the user.

The invention provides a cordless telephone which comprises a base unit and a remote unit which are capable of communicating with each other through radio transmission. Further the base unit and the remote unit have the same ID code which is transmitted when calling the remote unit from the base unit or calling the base unit from the remote unit. Communication between both units is established only when the received ID code agrees with its ID code.

Still further, a non-volatile memory element, which is capable of electrically reading and writing data, is used as the memory element to store the ID code, and abbreviated dialing numbers are stored in the remaining storage area of the non-volatile memory element.

The invention provides a cordless telephone which comprises;

a base unit and a remote unit, where the base unit including

1st memory means, including an electrically erasable programmable read only memory, for storing the ID code to identify the particular combination of the base unit and the remote unit, 1st modulator-transmitter circuits for transmitting modulated radio signal, means for reading the ID code stored in the 1st memory means and for subsequently transferring to the 1st modulator-transmitter circuits, and for subsequently transferring a signal from the telephone line to the 1st modulator-transmitter circuits, 1st receiver-demodulator means for receiving and demodulating the radio signal from the remote unit, and means for, in response to output from the 1st receiver-demodulator means, introducing the demodulated signal, following the ID code, onto the telephone line when the demodulated ID code and the ID code stored in the 1st memory means are identical, and the remote unit including input means for inputting the ID code, 2nd memory means for storing the ID code entered through the input means, a microphone, 2nd modulator-transmitter means for transmitting modulated radio signal to the base unit, means which reads the ID code stored in the 2nd storage means and for sending the ID code to the modulator-transmitter means, and for subsequently sending a signal from the microphone to the modulator-transmitter means, 2nd receiver-modulator means for receiving and modulating the radio signal from the base unit, a speaker and means for, in response to output from the 2nd receiver-demodulator means, converting the demodulated signal, which follows the ID code, into an acoustic signal by means of the speaker when the demodulated ID code and the ID code stored in the 2nd storage means are identical.

In a preferred embodiment, the 2nd memory means of the remote unit is an electrically erasable programmable read only memory.

In another preferred embodiment, the input means includes means for entering abbreviated dialing numbers including a plurality of digits, less in number than the digits of the dialing number of the destination terminal, the remote unit including means for reading the ID code stored in the 2nd storage means and sending the ID code to the 2nd modulator-transmitter circuits, and then subsequently sending the output of the abbreviated dialing number entry means to the 2nd modulator-transmitter circuits, the 1st memory means of the base unit storing dialing numbers which correspond to the abbreviated dialing numbers, the base unit further including means for, in response to output from the 1st receiver-modulator means, reading the dialing number stored in the 1st storage means corresponding to the abbreviated dialing number received, following the ID code, when the demodulated ID code agrees with the ID code stored in the 1st storage means, and sending the signal representing the dialing number to the 1st modulator-transmitter circuits.

According to the invention, an EEP-ROM, which is a non-volatile memory element capable of electrically reading and writing data as a memory element to store ID codes, is used and the remaining memory area of the non-volatile memory element is used to store abbreviated dialing numbers. This arrangement makes it unnecessary to separately provide a memory element to store the abbreviated dialing numbers and dispenses with the backup batteries for the abbreviated dialing numbers memory. The number of component parts can also be reduced, thereby enabling manufacture of the telephone set at lower cost.

BRIEF EXPLANATION OF THE DRAWINGS

These and other objectives, features and advantages of the invention will become more apparent when the detailed explanation that, follows is read in conjunction with the drawings.

FIG. 4 is a flow quart explanatory of the operation of a processor circuit 8 of the remote unit T1.

FIG. 5(1) and 5(2) are drawing illustrative of the format of a signal transmitted by the remote unit T1.

FIG. 7 is a flow chart explanatory of the operation of the processor circuit to transmit a signal which is received from the telephone line, from the base unit to the remote unit.

DETAILED EXPLANATION OF PREFERRED EMBODIMENTS

Figure 1:
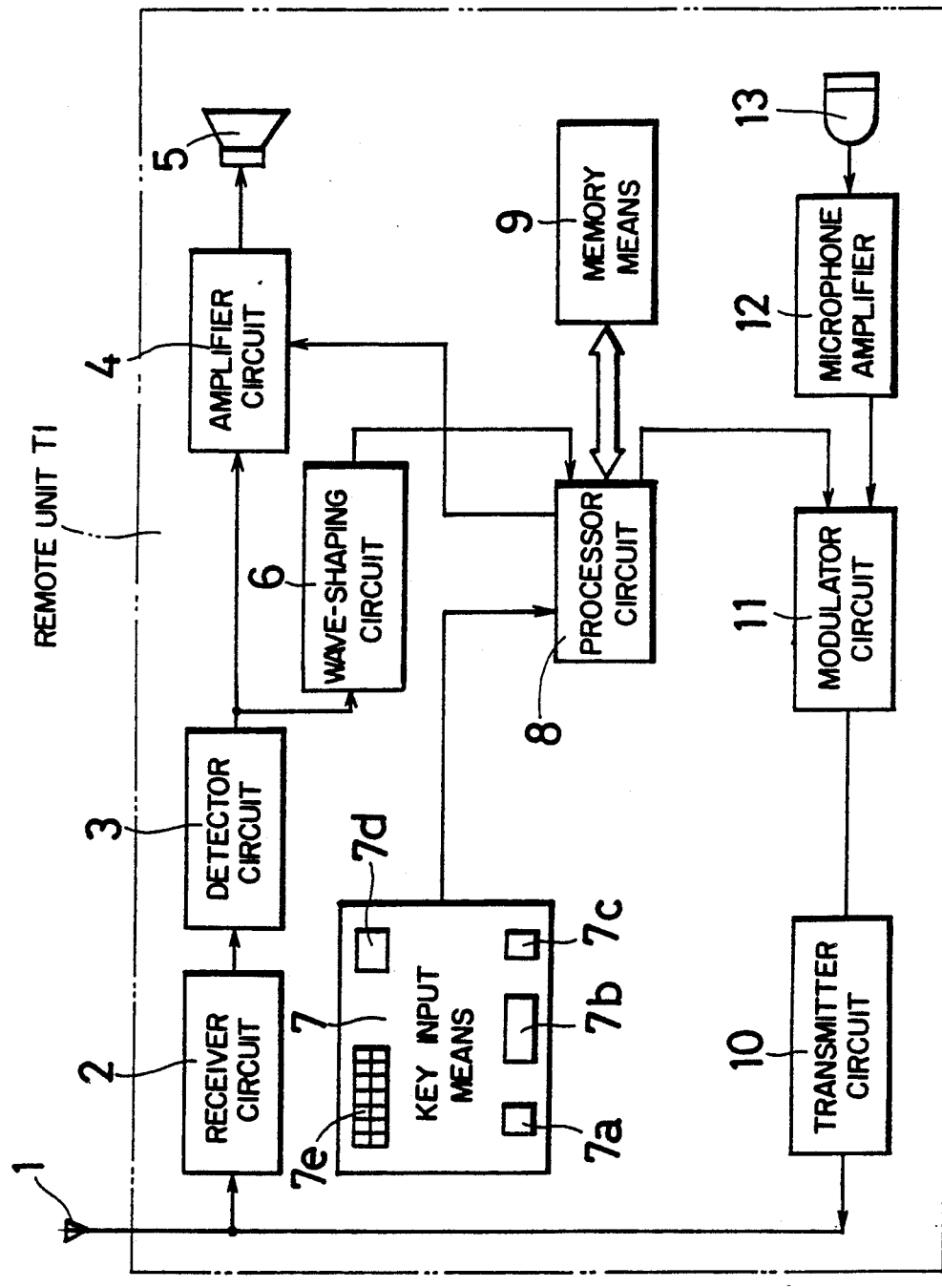
FIG. 1 is an outline block diagram illustrative of the electric wiring in the remote unit which constitute the cordless telephone set of the invention.

Preferred embodiments of the invention are explained in detail by referring to the drawings.

FIG. 1 is an outline block diagram of the remote unit which constitutes the cordless telephone set of an embodiment of the invention. In FIG. 1, 1 is an antenna, 2 is a receiver circuit, 3 is a detector circuit, 4 is an amplifier circuit, 5 is a speaker which is an ear piece, 6 is a wave-shaping circuit, 7 is a key matrix input device, 8 is a processor circuit, which is realized by a main microcomputer, 9 is a memory device which is a storage device comprising an EEP-ROM (Electrically Erasable Programmable read only memory), which includes a non-volatile memory element, 10 is a transmitter circuit, 11 is a modulator circuit, 12 is an amplifier for microphone output and 13 is the microphone.

An input signal received by the antenna 1 and the receiver circuit 2 is detected in the detector circuit 3 and is amplified in the amplifier circuit 4. An output signal from the amplifier circuit 4 is introduced into the speaker 5. Output from the detector circuit 3 is introduced into the processor circuit 8 via the wave-shaping circuit 6.

The processor circuit 8 and the memory device 9 are connected by a bidirectional connection. The memory device 9 is arranged so that the ID code and abbreviated dialing numbers provided to call a destination telephone by identifying it with a plurality of digits, less in number than the digits of the dialing number of the destination telephone, which are sent from the processor circuit 8, are stored in the respective memory areas. The processor circuit 8 reads the ID codes and the abbreviated dialing numbers, which are stored in the memory device 9 as required. The processor circuit 8 is fed with output of the key input device 7, and the output is introduced into the antenna 1 via the modulator circuit 11 and the transmitter circuit 10. Output of the microphone 13 is amplified in the microphone amplifier 12 and is fed to the modulator circuit 11.

Figure 2:
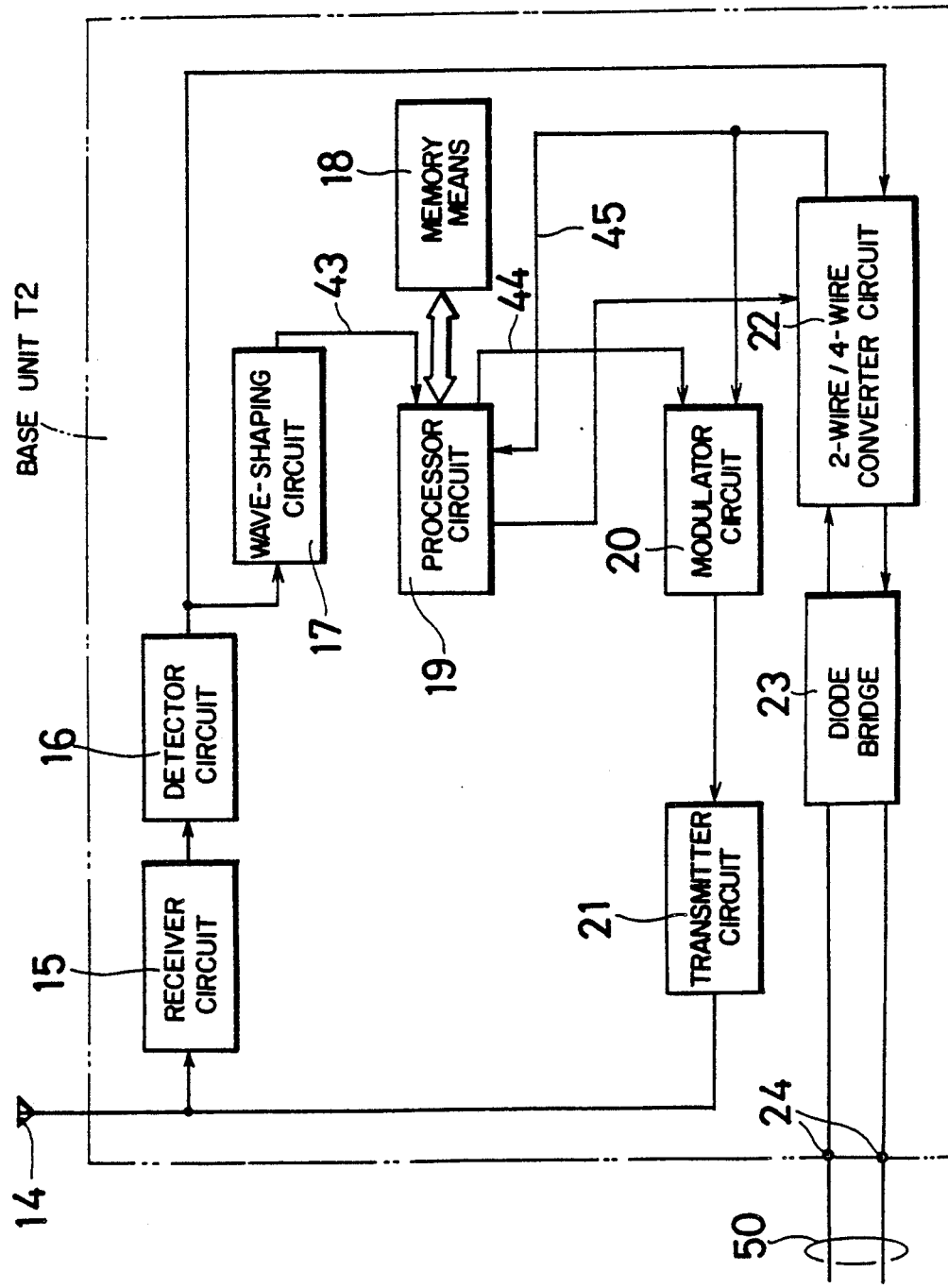
FIG. 2 is an outline block diagram illustrative of the electric wiring in the base unit which constitutes the cordless telephone set of the invention.

FIG. 2 is an outline block diagram illustrative of the base unit T2 which constitutes the cordless telephone set of an embodiment of the invention. In FIG. 2, 14 is an antenna, 15 is a receiver circuit, 16 is a detector circuit, 17 is a wave-shaping circuit, and 18 is a memory device which includes an EEP-ROM and 19 is a main microcomputer. The memory device includes memory area M1 to store ID codes and another memory area M2 to store the abbreviated dialing numbers. 20 is a modulator circuit, 21 is a transmitter circuit, 22 is a 2-wire/4-wire converter circuit, 23 is a diode bridge and 24 is a connector terminal for a telephone line 50.

An input signal received by the antenna 14 and the received circuit 15 is detected in the detector circuit 16. A detector output is introduced into the 2-wire/4-wire converter circuit 22 and is, at the same time, introduced into the processor circuit 19 via the wave-shaping circuit 17.

Output of the 2-wire/4-wire converter circuit 22 is transmitted onto the telephone line 50 via the diode bridge 23 and the connector terminal 25. Signals sent from a mating terminal on the telephone line 50 are introduced into the modulator circuit 20 via the connector terminal 24, the diode bridge 23 and the 2-wire/4-wire converter circuit 22. They are then introduced into the antenna 14 via the transmitter circuit 21.

Figure 3:
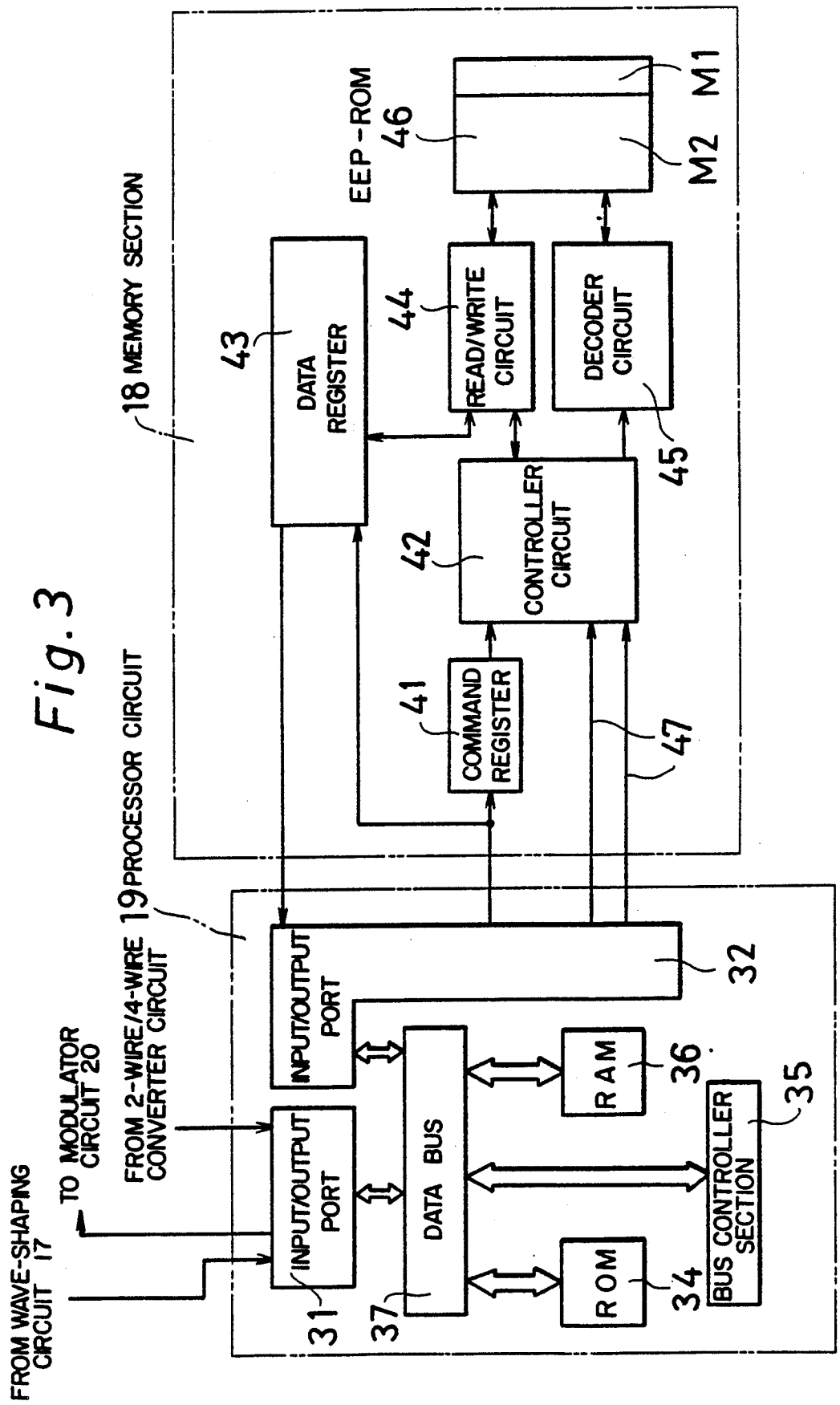
FIG. 3 is an outline block diagram illustrative of the electric wiring connecting a main microcomputer and a memory section which constitute the cordless telephone set of the invention.

FIG. 3 is a block diagram illustrative of the specific construction of the processor circuit 19 and the memory device 18. The processor circuit 19 and the memory device 18 are connected by a bidirectional connection. The memory section 18 includes a memory area M1 to store the ID code which is sent from the processor circuit 19 and another memory area M2 to store the abbreviated dialing numbers. The processor circuit 19 reads the ID code and the abbreviated dialing numbers stored in the memory section 18 as required. Output of the processor circuit 19 is used in the modulator circuit 20 to modulate the carrier wave which is then introduced into the antenna 14 via the transmitter circuit 21.

FIG. 4 is first referred to in the following explanation of the operation of the remote unit T1 in the cordless telephone, followed by the explanation of the signal sent by the remote unit T1 shown in FIG. 4 via radio transmission. In the remote unit T1, upon proceeding from step r1 to step r2, the operation proceeds to step r3 when one or more ID codes are stored in the memory in advance. A call key 7a of the key input device 7 is depressed and thereafter numeral keys 7e are operated to enter a dialing number. Alternatively, an abbreviation button 7b is depressed after depressed the call key 7a, and then the abbreviated dialing number is entered by operating the numeral keys 7e. Thereafter the processor circuit 8 reads the ID code which was stored in the memory device 9 in advance, and feeds the signal to the modulator circuit 11 in step r4 where carrier wave is modulated in step r5. In step r6, the modulated carrier wave from the modulator circuit 11 is power-amplified in the transmitter circuit 10 and is transmitted from the antenna 1. The dialing number, which was entered through the numeral keys as mentioned before, is modulated by the modulator circuit 11 and is transmitted by the transmitter circuit 10 via the antenna 1. When, abbreviated dialing number has been entered instead of the dialing number, the modulator circuit 11 modulates the carrier wave with a signal which represents the abbreviated dialing number, and the carrier wave is transmitted by the transmitter circuit 10 via the antenna 1.

Format of the radio signal which is transmitted from the remote unit T1 via the antenna 1 in step r6 is shown in FIG. 5 (1).

The memory device 9 in the remote unit T1 may be a random access memory RAM which is constantly energized by primary batteries or secondary batteries, or an EEP-ROM which is similar to the memory device 18. When a RAM is used for the memory device 9 in the remote unit T1, even when the stored data of the RAM is erased due to exhaustion of the batteries, the same ID codes can be easily stored again in the storage area M1 of the memory device 18 in the base unit T2. This is achieved by entering the ID codes again by the operation of the input device 7. With the ID code which represents the combination of the remote unit T1 and the base unit T2 stored in the memory devices 9 and 18, interference in communication can be prevented when a plurality of combinations exist by setting different ID codes for the respective combinations, and it is the enabled to make telephone communication over a desired trunk line.

It is not necessary to store the abbreviated dialing numbers and the corresponding dialing numbers in the memory device 9. Therefore, in case the memory device 9 is realized by utilizing a random access memory, erasure of the content thereof does not cause a trouble but requires only re-entering of the ID code as previously mentioned.

Operation of the base unit T2 is hereafter explained briefly. In the base unit T2, the signal from the remote unit T1 is received by the receiver circuit 15 via the antenna 14, and is demodulated in the detector circuit 16. Then the waveform of the signal is corrected by the wave-shaping circuit 17 and the signal is fed to the processor circuit 19 in the form of serial data. The processor circuit 19 reads the ID code which was stored in the memory device 18 beforehand and compares it with the ID code which has been received from the remote unit. When both ID codes are identical, radio transmission from the base unit T2 is enabled to establish the radio transmission circuit between the remote unit T1 and the base unit T2, thereby enabling the radio communication between the remote unit T1 and the base unit T2. After telephone communication with the mating terminal has been enabled via the base unit T2 and the telephone line 50, an audio signal from the microphone 13 of the remote unit T1 is amplified by the microphone amplifier 12, modulated by the modulator circuit 11 and is transmitted to the base unit T2 by the transmitter 10 via the antenna 1. In the base unit T2, the audio signal is received by the receiver circuit 15 via the antenna 14 and is sent out onto the telephone line 50 via the 2-wire/4-wire converter circuit 22, the diode bridge 23 and the connector terminal 24.

An audio signal which is sent over the telephone line 50 from the mating terminal is fed to the modulator circuit 20 via the connector circuit 24, diode bridge 23 and the 2-wire/4-wire converter circuit 22. In the modulator circuit 20, the modulated carrier wave is transmitted to the remote unit T1 by the transmitter circuit 21 via the antenna 14. A radio signal, transmitted from the antenna 14, has a format similar to that shown in FIG. 5 (2).

In the remote unit T1, the incoming signal is received by the receiver circuit 2 via the antenna 1 and is demodulated in the detector circuit 3. The audio signal which is demodulated in the detector circuit 3 is amplified in the amplifier circuit 4 to a level enough to drive the speaker 5, and thus is delivered as an acoustic signal from the speaker 5.

Registration of the ID code and the abbreviated dialing numbers is performed by operating the key input device 7. When no ID code is stored in the memory devices 9 and 18, the sequence in the remote unit T1 moves from step r2 to step r8 where the memory key 7c provided on the input device 7 is depressed, ID code entry key 7d is operated and the numeral keys 7e are operated thereby to enter the ID code. The ID code is stored in the memory device 9 by the work of the processor 8. The ID code is also sent from the processor circuit 8 to the modulator circuit 11 where it modulates the carrier wave which is transmitted by the transmitter 10 via the antenna 1 to the base unit T2.

In order to enter an abbreviated dialing number through the key input device 7 and store it in the storage area M2 of a memory device 46, the memory key 7c is operated followed by the operation of the abbreviation button 7b. Thereafter the numeral keys 7e are operated to enter the abbreviated dialing number followed by the entry of the dialing number by way of the numeral keys 7e. The abbreviated dialing number and the corresponding dialing number which are entered in this way are transmitted to the base unit T2 via the modulator circuit 11, the transmitter circuit 10 and the antenna 1. In order to store the ID code in the memory devices 9 and 18, and to store the abbreviated dialing number and the corresponding dialing number in the memory device 18, the signal representing the ID code is transmitted from the remote unit T1. Thereby communication by combination of the remote unit T1 and the base unit T2 is performed, as described before.

The following description explains the operations of writing and reading the ID code and the abbreviated dialing number by way of the processor circuit 19 and the memory device 18 of the base unit T2, with reference to FIGS. 2, 3, 6 and 7.

In FIG. 3, 31 is an input/output port to receive data via a wave-shaping circuit 17 and to send data to a modulator circuit 20, 32 is an input/output port to exchange various data with the memory device 18, 34 is a ROM, 35 is a bus controller section, 36 is a RAM and 37 is a data bus to send data to these internal circuits. 41 is a command register, 42 is a controller circuit, 43 is a data register, 44 is a read/write circuit, 45 is a decoder circuit and 46 is an EEP-ROM circuit (abbreviated as E$^2$P-ROM hereafter).

Figure 6:
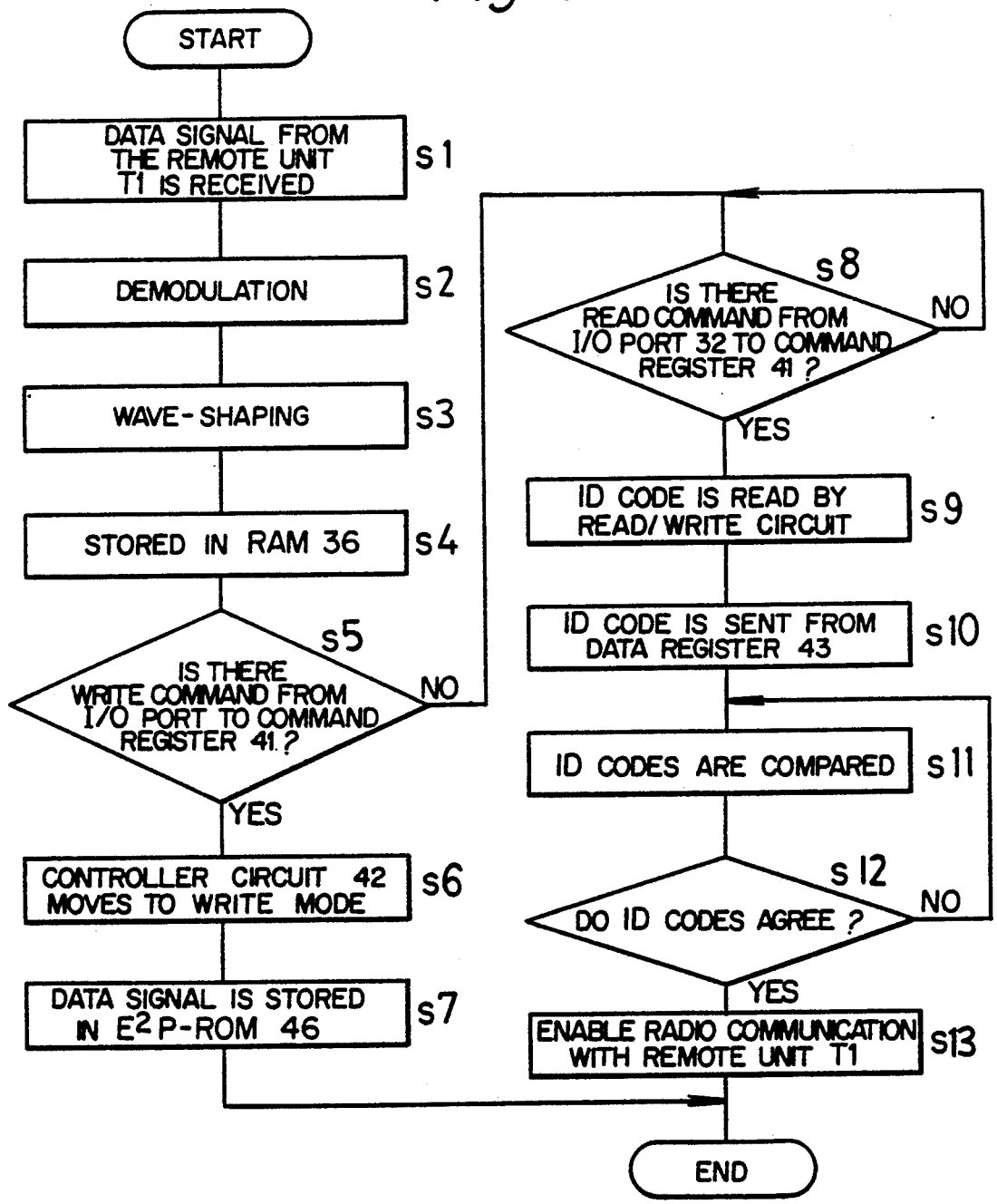
FIG. 6 is a flow chart illustrative of the operation of the processor circuit 19 of the base unit to store ID codes, abbreviated dialing numbers and the dialing numbers corresponding thereto, and is also explanatory of the operation of receiving signals from the remote unit.

In step s1 in FIG. 6, the ID code or the abbreviated dialing number and the corresponding dialing number transmitted from the remote unit is received, demodulated in the detector circuit 16 in step s2, processed to trim the waveform in the wave-shaping circuit 17 in step s1, and is fed to the processor circuit 19 via the line 43. In FIG. 3, the signal which represents the ID code and has been received via the input/output port 31 is tentatively stored in a RAM 36 via a data bus 37 in step s4. In case the ID code is not stored in the storage area M1 of the E$^2$P-ROM in the memory device 48, as will be described later, when one ID code consisting of a string of numerical characters is stored in the RAM 36, then writing of it in the E²P-ROM 46 of the memory device 18 via the input/output port 32 is started.

This means that it is determined in step s5 whether a write command is sent to the command register 41 of the memory device 18 from the input/output port 32.

This command code is tentatively held by the command register 41 before being sent to the controller circuit 42. In step s6, the controller circuit 42 moves into the mode of writing in storage area M1 of the E²P-ROM 46 by decoding the entered command code. Then in step s7, a data signal representing the ID code, which has been sent from the RAM 36 via the input/output port 32, is stored by the read/write circuit 44 in the specified storage area M1 of the E²P-ROM 46 via the data register 43. Location in the storage area M1, where the data signal is to be stored, is determined by way of an address signal, which has been transferred via the input/output port and an address bus, and is decoded by the decoder circuit 45.

On the other hand, the ID code which was stored in the E²P-ROM 46 in the procedure described above is read by skipping from step s5 to s8 and sending a read command from the input/output port 32 of the processor circuit 19 to the command register 41 of the memory device 18. Namely, operation is turned to a read mode by sending the command code which has been tentatively stored in the command register 41, to the controller circuit 41 and decoding the command code in the controller circuit 42. Then the ID code is read from the specified storage area M1 of the E²P-ROM 46 by the read/write circuit 44 in step s9, and in step 10 the ID code is sent to the input/output port 32 of the processor circuit 19 after being tentatively stored in the data register 43. In step 11, the processor circuit 19 compares the ID code from the remote unit T1 which has been sent from the input/output port 31 with the ID code which has been read from the E²-ROM 46. If these ID codes are identical, it turns on the radio transmission of the base unit T2 in step s12 and establishes the radio communication circuit with the remote unit T1 in step s13.

In FIG. 7, to send the signal from the base unit T2 to the remote unit T1 via the antenna 14, the operation moves from step u1 to step u2 as shown in FIG. 7, and the signal from the telephone line 50 is received in the processor circuit 19. When it is determined that a read command is sent in step u3 from the input/output port 32 to the command register 41 shown in FIG. 3, the operation moves to step u4 where the ID code is read by the read/write circuit 44. It then moves to step u5 where the ID code is sent from the data register 43 to the decoder circuit 20 where the carrier wave is modulated and is transmitted through the antenna 14 after being power-amplified in the transmitter circuit 21. After the ID code is transmitted in step u6, the signal from the telephone line 50 is processed to modulate the carrier wave which is transmitted by the transmitter circuit 21 via the antenna 14.

Registration of abbreviated dialing numbers in the remaining storage area M2 of the E²-ROM 46 where the ID code has been stored in the above procedure, can be performed similarly to the above registration procedure of the ID code, and thus is not further explained.

While E²P-ROM 46 is installed in the base unit T2 in the embodiment described above, it may be installed in the remote unit T1 in another embodiment of the invention.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and the range of equivalency of the claims are therefore intended to be embraced therein.

What is claimed is:

1. A cordless telephone for transmitting and receiving telephone calls including a base unit and a remote unit capable of communicating with each other through radio transmission, where both the base unit and the remote unit include a programmable ID code which is transmitted when the remote unit desires radio transmission of an outgoing telephone call via the base unit or the base unit desires radio transmission of an incoming telephone call to the remote unit whereupon communication of incoming and outgoing telephone calls through radio transmission, between both units, is established only when the ID code of a remote unit is identical to the ID code of the base unit, the remote unit further including, storage means for storing said programmable ID code, and input means, operatively connected to said storage means and including a programming key, numerical keys and an ID key, for inputting said ID code into said storage means upon activating said programming key and said ID key and numerical keys corresponding to the ID code, and for subsequently outputting a radio transmission to the base unit, including the ID code;

the base unit including, detecting means for receiving said output radio transmission, including said ID code, and for detecting activation of said programming key and ID key, control means, operatively connected to said detecting means, for outputting a first write signal, followed by said ID code, in response to said detecting means detecting activation of said programming key and said ID key, and non-volatile memory means, operatively connected to said control means and capable of accessing and storing data, for, upon receiving said output first write signal, storing said ID code in a first memory area.

2. The cordless telephone of claim 1, wherein in the remote unit, upon the remote unit desiring transmission of an outgoing call to another remote telephone, said input means, including a calling key, for inputting a telephone number subsequent to said calling key being activated, corresponding to said another remote telephone, said storage means, in response to said input means, automatically accessing said stored programmable ID code and outputting said programmable ID code, and subsequently, said input telephone number, and wherein, in the base unit, said detecting means receives said output radio transmission, including the ID code and input telephone number, and detects activation of said calling key, said control means outputs a first read signal, followed by said ID code and input telephone number, in response to said detecting means detecting activation of said calling key, said non-volatile memory means, upon receiving said output first read signal, accesses the stored ID code, compares the stored ID code to the ID code received in said radio transmission, and upon determining that the ID codes are identical, outputs a signal to said control means authorizing output of said received telephone number and subsequent transmission of an outgoing call.

3. The cordless telephone of claim 1 wherein said input means of the remote unit further includes an abbreviated number key for, upon activation of said programming key, being activated, followed by an input abbreviated telephone number, containing a plurality of digits, less in number, than a plurality of digits in a standard telephone number, and an input of said standard telephone number, and outputs a radio transmission including the abbreviated telephone number and standard telephone number to the base unit, and wherein in the base unit, said detecting means receives said output radio transmission, including the abbreviated and standard telephone numbers, and detects activation of said programming and abbreviated number key, said control means outputs a second wire signal, followed by said abbreviated and standard telephone numbers, in response to the detecting means detecting activation of said programming key and said abbreviated number key, said non-volatile memory means, upon receiving said output second write signal, stores said abbreviated and standard telephone numbers in a second memory area.

4. The cordless telephone of claim 3 wherein in the remote unit, upon the remote unit desiring transmission of an outgoing call to another remote telephone, said input means, including a calling key, actuates said calling key and said abbreviated number key and inputs an abbreviated number, prestored in said non-volatile memory means of said base unit with a standard telephone number corresponding to another remote telephone, said storage means, in response to said input means, accesses said stored programmable ID code and outputs a radio transmission including said programmable ID code and, subsequently, said input abbreviated number; and wherein, in the base unit, said detecting means receives said output radio transmission, including the ID code and abbreviated number, and detects activation of said calling key and abbreviated number key, said control means outputs a second read signal, followed by said ID code and said abbreviated number, in response to said detecting means detecting activation of said calling key and abbreviated number key, said non-volatile memory means, upon receiving said output second read signal, accesses the stored ID code, compares the stored ID code to the ID code received in the radio transmission, and, upon determining that the ID codes are identical, accesses a standard telephone number, utilizing by the received abbreviation number, prestored with a corresponding abbreviated number identical to the received abbreviated number, for subsequent transmission of an outgoing call.

5. A cordless telephone comprising:
a base unit and a remote unit,
wherein the base unit includes, detecting means for receiving a first radio transmission, including an ID code, from a remote unit and for detecting activation of a programming key and ID key from the remote unit, control means, operatively connected to said detecting means, for outputting a first write signal, followed by said ID code, in response to said detecting means detecting activation of said programming key and said ID key from the remote unit.

first memory means, including an electrically erasable programmable read only memory, for storing the ID code, received as a portion of the first radio transmission from the remote unit, to identify the particular combination of the base unit and the remote unit upon the detecting means detecting indication of an activated programming key, at the remote unit, from the first radio transmission, first modulator transmitter means for modulating and transmitting a radio signal, means for reading the ID code stored in the first memory means and for outputting the read ID code to the first modulator-transmitter means upon receiving a second radio transmission from the remote unit, and for subsequently transferring the second radio transmission, to the first modulator-transmitter means, first receiver-demodulator means for receiving and demodulating the second radio transmission, including the ID code and a remote telephone number, from the remote unit, and means for, in response to output from the first receiver-demodulator means, inputting a portion of the demodulated second radio transmission, the portion following the ID code containing the remote telephone number, onto a telephone line when the demodulated received ID code and the ID code stored in the first memory means are identical, and the remote unit including, input means, including a programming key, for, upon activation of the programming key, inputting an ID code, second memory means for storing the ID code input through the input means, a microphone for inputting an audible signal, second modulator-transmitter means for transmitting a modulated radio signal, including the ID code and indication of activation of the programming key, as a first radio transmission to the base unit, said input means inputting the remote telephone number to access another remote telephone, means for automatic accessing the ID code stored in the second memory means, for outputting the automatically accessed ID code and the remote telephone number to the second modulator-transmitter means, and for subsequently outputting the audible signal from the microphone to the second modulator-transmitter means, said second modulator transmitter means transmitting a modulated radio signal including the automatically accessed ID code and the remote telephone number, as a second radio transmission, second receiver-demodulator means for receiving and demodulating a radio signal from the base unit, a speaker and means for, in response to an output from the second receiver-demodulator means, converting the demodulated signal following the ID code and remote telephone number, into an acoustic signal by means of the speaker when the demodulated ID code and the ID code stored in the second storage means are identical and upon connecting to a remote telephone.

6. The cordless telephone as claimed in claim 5, wherein the second memory means of the remote unit is an electrically erasable programmable read only memory.

7. The cordless telephone as claimed in claim 5, wherein the input means includes means for inputting an abbreviated dialing number consisting of a plurality of digits, less in number than the number of digits of the dialing number of the destination terminal, the remote unit including means for reading the ID code stored in the second storage means and for outputting the ID code to the second modulator-transmitter means, and for subsequently outputting the input abbreviated dialing number to the second modulator-transmitter means, the first memory means of the base unit storing dialing numbers of destination terminals with corresponding abbreviated dialing numbers, the base unit further including means for, in response to output from the first receiver-modulator means, reading the dialing number of a destination terminal stored in the first storage means corresponding to the abbreviated dialing number received from the remote unit, following the ID code, when the received demodulated ID code is identical to the ID code stored in the first storage means, and for outputting a signal representing the dialing number to the first modulator-transmitter means.

* * * * *